(12) United States Patent
Price et al.

(10) Patent No.: US 11,683,593 B2
(45) Date of Patent: *Jun. 20, 2023

(54) HIGH DYNAMIC RANGE IMAGE CAPTURE USING SINGLE PHOTON AVALANCHE DIODES

(71) Applicant: Microsoft Technology Licensing, LLC, Redmond, WA (US)

(72) Inventors: Raymond Kirk Price, Redmond, WA (US); Christopher Douglas Edmonds, Carnation, WA (US); Michael Bleyer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,131

(22) Filed: Jun. 28, 2022

(65) Prior Publication Data

US 2022/0329722 A1 Oct. 13, 2022

Related U.S. Application Data

(63) Continuation of application No. 17/181,922, filed on Feb. 22, 2021, now Pat. No. 11,431,918.

(51) Int. Cl.
*H04N 23/741* (2023.01)
*H04N 23/73* (2023.01)
(Continued)

(52) U.S. Cl.
CPC .......... *H04N 23/741* (2023.01); *G06T 5/003* (2013.01); *G06T 5/50* (2013.01); *H04N 23/73* (2023.01);
(Continued)

(58) Field of Classification Search
CPC .. H04N 5/2355; H04N 5/2353; H04N 23/741; H04N 23/73; H04N 23/6812;
(Continued)

(56) References Cited

U.S. PATENT DOCUMENTS 11,075,234 B2 * 7/2021 Price ................. H01L 27/14605
11,431,918 B1 * 8/2022 Price ....................... G06T 5/003
(Continued)

OTHER PUBLICATIONS

"International Search Report and Written Opinion issued in PCT Application No. PCT/US2022/013778", dated Jul. 5, 2022, 17 Pages.

*Primary Examiner* — Kelly L Jerabek
(74) *Attorney, Agent, or Firm* — Workman Nydegger

(57) ABSTRACT

A system for HDR image capture is configurable to perform a split long exposure operation by applying a first set of long exposure shutter operations to configure each sensor pixel of the image sensor array to enable photon detection and applying a second set of long exposure shutter operations to configure each sensor pixel to enable photon detection. A time period intervenes between the first and second sets of long exposure shutter. The system is configurable to perform a short exposure operation by applying a set of short exposure shutter operations to configure each sensor pixel to enable photon detection. The short exposure operation occurs during the time period that intervenes between the first and second sets of long exposure shutter operations. The system is also configurable to generate an image based on the split long exposure operation and the short exposure operation.

21 Claims, 8 Drawing Sheets

(51) Int. Cl.
  *G06T 5/00* (2006.01)
  *G06T 5/50* (2006.01)
(52) U.S. Cl.
  CPC .............. *G06T 2207/10144* (2013.01); *G06T 2207/20201* (2013.01); *G06T 2207/20208* (2013.01)
(58) Field of Classification Search
  CPC ......... H04N 25/589; G06T 5/003; G06T 5/50; G06T 2207/10144; G06T 2207/20201; G06T 2207/20208
  See application file for complete search history.

(56) References Cited

U.S. PATENT DOCUMENTS

| | | | | |
|---|---|---|---|---|
| 2019/0305018 | A1* | 10/2019 | Price | H01L 27/14605 |
| 2021/0092275 | A1* | 3/2021 | Gnecchi | H04N 5/374 |
| 2021/0319606 | A1* | 10/2021 | Gupta | G06T 3/0093 |
| 2021/0351222 | A1* | 11/2021 | McGarvey | H01L 31/02325 |

* cited by examiner

HIGH DYNAMIC RANGE IMAGE CAPTURE USING SINGLE PHOTON AVALANCHE DIODES

CROSS-REFERENCE TO RELATED APPLICATIONS

This application is a continuation of U.S. patent application Ser. No. 17/181,922, filed on Feb. 22, 2021 and entitled "HIGH DYNAMIC RANGE IMAGE CAPTURE USING SINGLE PHOTON AVALANCHE DIODES", which is incorporated herein by reference in its entirety.

BACKGROUND

High dynamic range (HDR) imaging was developed in an effort to improve images of captured environments that include both brightly illuminated areas/objects and relatively darker areas/objects. As a simple and brief introduction, HDR imaging generates two separate images. One image is generated using a prolonged exposure time to detect enough photons to capture the dark, shadowy areas/objects within a captured environment. The other image uses a very short exposure time to detect photons for capturing the brightly lit areas/objects while avoiding oversaturation. These two images are then blended/stitched together via signal/image processing to generate a composite image that shows objects in the bright areas (as opposed to simply a washed-out white blur) as well as objects in the dark areas (as opposed to simply a dark blur), effectively increasing the dynamic range of the combined images.

While traditional HDR sensors can provide accurate and highly dynamic images for static environments, serious problems arise when HDR sensors are used to generate images of environments that include moving objects in the scene (or where the image sensor is moving relative to the scene). To illustrate, the long-exposure image and the short-exposure image used to form an HDR image are typically captured at different times (i.e., one after the other). Thus, when relative motion is present between the image sensor and the captured environment, the objects captured in the long-exposure image can become spatially misaligned with the same objects captured in the short-exposure image. This misalignment can result in blurring artifacts that reduce image quality and/or intelligibility. In addition, the lengthy exposure time used to capture the long-exposure image can further contribute to the motion blur present in the final image.

Although some techniques relying on motion tracking or image processing have arisen in an attempt to combat motion blur in HDR imaging, these techniques consume system power and computational resources, which is limited in many imaging systems (e.g., head-mounted displays (HMDs)).

Thus, for at least the foregoing reasons, there is an ongoing need and desire for improved systems and techniques for HDR image capture.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed to systems, methods and devices for high dynamic range (HDR) image capture.

Some embodiments include a system comprising an image sensor array that has a plurality of sensor pixels. The system includes one or more processors and one or more hardware storage devices storing instructions that are executable by the one or more processors to configure the system to perform various acts. The system is configurable to perform a split long exposure operation. The split long exposure operation includes (i) applying a first set of long exposure shutter operations to configure each sensor pixel of the image sensor array to enable photon detection and (ii) applying a second set of long exposure shutter operations to configure each sensor pixel of the image sensor array to enable photon detection, wherein a time period intervenes between the applying of the first set of long exposure shutter operations and the applying of the second set of long exposure shutter operations. The system is also configurable to perform a short exposure operation. The short exposure operation includes applying a set of short exposure shutter operations to configure each sensor pixel of the image sensor array to enable photon detection, the set of short exposure shutter operations being applied during the time period that intervenes between the applying of the first set of long exposure shutter operations and the applying of the second set of long exposure shutter operations. The system is also configurable to generate an image based at least on a number of photons detected during the split long exposure operation and a number of photons detected during the short exposure operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
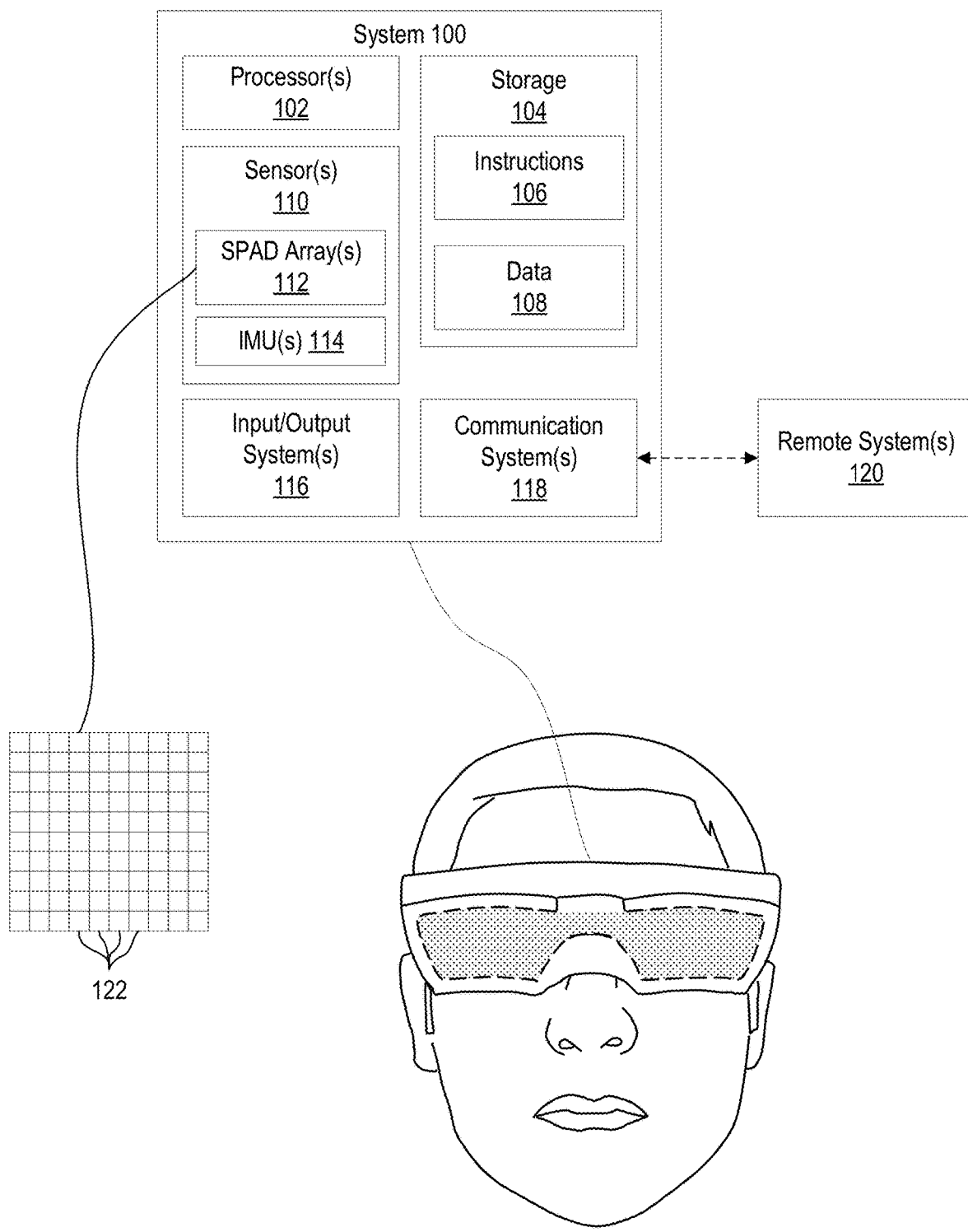
FIG. 1 illustrates example components of an example system that may include or be used to implement one or more disclosed embodiments.

Disclosed embodiments are generally directed to systems, methods, and devices that facilitate high dynamic range (HDR) image capture using single photon avalanche diodes (SPADs).

Examples of Technical Benefits, Improvements, and Practical Applications

Those skilled in the art will recognize, in view of the present disclosure, that at least some of the disclosed embodiments may be implemented to address various shortcomings associated with at least some conventional techniques and/or systems for HDR image capture. The following section outlines some example improvements and/or practical applications provided by the disclosed embodiments. It will be appreciated, however, that the following are examples only and that the embodiments described herein are in no way limited to the example improvements discussed herein.

A SPAD is operated at a bias voltage that enables the SPAD to detect a single photon. Upon detecting a single photon, an electron-hole pair is formed, and the electron is accelerated across a high electric field, causing avalanche multiplication (e.g., generating additional electron-hole pairs). Thus, each detected photon may trigger an avalanche event. A SPAD may operate in a gated manner (each gate corresponding to a separate shutter operation), where each gated shutter operation may be configured to result in a binary output. The binary output may comprise a "1" where an avalanche event was detected during an exposure (e.g., where a photon was detected), or a "0" where no avalanche event was detected.

Separate shutter operations may be integrated over a frame capture time period (e.g., a 30 Hz time period, or some other framerate). The binary output of the shutter operations over a frame capture time period may be counted, and an intensity value may be calculated based on the counted binary output.

An array of SPADs may form an image sensor, with each SPAD forming a separate pixel in the SPAD array. To capture an image of an environment, each SPAD pixel may detect avalanche events and provide binary output for consecutive shutter operations in the manner described herein. The per-pixel binary output of multiple shutter operations over a frame capture time period may be counted, and per-pixel intensity values may be calculated based on the counted per-pixel binary output. The per-pixel intensity values may be used to form an intensity image of an environment.

The use of SPAD image sensors for HDR image capture as described herein may provide a number of advantages over conventional systems and techniques for HDR image capture. As described in more detail hereinafter, a long exposure operation for capturing darker objects in an environment may be split into multiple parts that are read out separately to form separate long-exposure images. In between the separate parts of the long exposure operation, a short-exposure operation may be performed and read out to form a short-exposure image to capture brighter objects in the environment. The separate long-exposure images and the short-exposure image may be combined for forming a final HDR image that captures both the brighter and darker objects in the environment.

Splitting the long exposure operation into separate exposures may reduce the motion artifacts and/or error accumulation that may arise during the separate (shorter) exposures. Furthermore, by performing the short exposure operation in between the separate parts of the long exposure operation, the effects of misalignment between the short-exposure image and the separate long-exposure images may be reduced.

In addition, the techniques described herein may be used in concert with motion compensation techniques (e.g., computer vision-based techniques, motion-based techniques) to provide improved HDR images with further mitigated motion blur.

The binarization of the SPAD output effectively eliminates read noise, thereby improving signal-to-noise ratio for SPAD image sensor arrays as compared with conventional CMOS and/or CCD sensors (particularly in low light environments). Thus, splitting the long exposure operation into multiple parts that are read out separately and performing an intervening short exposure operation that is read out separately does not result in increased read noise. In contrast, attempting to perform such split long exposure operations with an intervening short exposure operation would result in increased read noise in CMOS and/or CCD sensors.

Furthermore, in contrast with CMOS and CCD sensor systems that include spatially multiplexed sets of sensor pixels for simultaneously performing short and long exposure operations for HDR imaging, the present techniques can be performed using a single set of SPAD pixels to facilitate split long exposure and short exposure as described herein, thereby avoiding the design and manufacture complexities associated with spatially multiplexed sets of sensor pixels.

Having just described some of the various high-level features and benefits of the disclosed embodiments, attention will now be directed to FIGS. 1 through 5. These Figures illustrate various conceptual representations, architectures, methods, and supporting illustrations related to the disclosed embodiments.

Example Systems and Techniques for HDR Image Capture Using SPADs

Attention is now directed to FIG. 1, which illustrates an example system 100 that may include or be used to implement one or more disclosed embodiments. FIG. 1 depicts the system 100 as a head-mounted display (HMD) configured for placement over a head of a user to display virtual content for viewing by the user's eyes. Such an HMD may comprise an augmented reality (AR) system, a virtual reality (VR) system, and/or any other type of HMD. Although the present disclosure focuses, in at least some respects, on a system 100 implemented as an HMD, it should be noted that the techniques described herein for utilizing SPAD arrays may be implemented using other types of systems/devices, without limitation.

FIG. 1 illustrates various example components of the system 100. For example, FIG. 1 illustrates an implementation in which the system includes processor(s) 102, storage 104, sensor(s) 110, I/O system(s) 116, and communication system(s) 118. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions associated with HDR imaging using SPAD arrays. The actions may rely at least in part on data 108 (e.g., avalanche event counting or tracking, etc.) stored on storage 104 in a volatile or non-volatile manner.

In some instances, the actions may rely at least in part on communication system(s) 118 for receiving data from remote system(s) 120, which may include, for example, separate systems or computing devices, sensors, and/or others. The communications system(s) 120 may comprise any combination of software or hardware components that are operable to facilitate communication between on-system components/devices and/or with off-system components/devices. For example, the communications system(s) 120 may comprise ports, buses, or other physical connection apparatuses for communicating with other devices/components. Additionally, or alternatively, the communications system(s) 120 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable phenomenon. By way of non-limiting example, the sensor(s) 110 may comprise one or more image sensors, microphones, thermometers, barometers, magnetometers, accelerometers, gyroscopes, and/or others.

FIG. 1 also illustrates that the sensor(s) 110 include SPAD array(s) 112. As depicted in FIG. 1, a SPAD array 112 comprises an arrangement of SPAD pixels 122 that are each configured to facilitate avalanche events in response to sensing a photon, as described hereinabove. As will be described in more detail hereinafter, SPAD array(s) 112 may be implemented on a system 100 (e.g., an MR HMD) to facilitate various image capture functions associated with HDR imaging.

FIG. 1 also illustrates that the sensor(s) 110 include inertial measurement unit(s) 114 (IMU(s) 114). IMU(s) 114 may comprise any number of accelerometers, gyroscopes, and/or magnetometers to capture motion data associated with the system 100 as the system moves within physical space.

Furthermore, FIG. 1 illustrates that a system 100 may comprise or be in communication with I/O system(s) 116. I/O system(s) 116 may include any type of input or output device such as, by way of non-limiting example, a touch screen, a mouse, a keyboard, a controller, and/or others, without limitation. For example, the I/O system(s) 116 may include a display system that may comprise any number of display panels, optics, laser scanning display assemblies, and/or other components. In some instances, a SPAD array 112 may be configured with a resolution of SPAD pixels 122 that matches a pixel resolution of a display system, which may facilitate high-fidelity pass-through imaging.

Figure 2A:
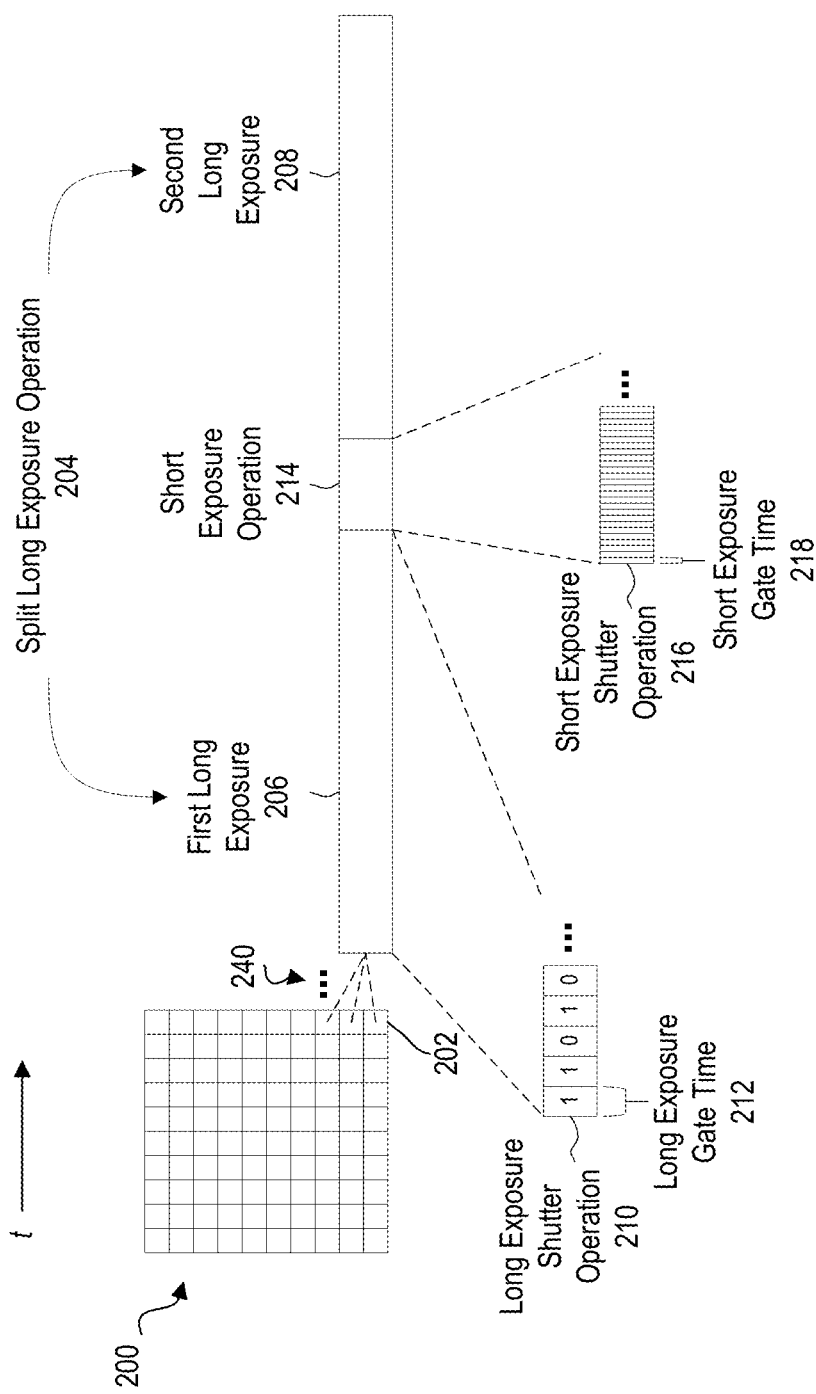
FIGS. 2A-2D illustrate example exposure operations that may be performed using a single photon avalanche diode (SPAD) array to capture a high dynamic range (HDR) image.

Attention is now directed to FIGS. 2A-2D, which illustrate example exposure operations that may be performed using a SPAD array to capture an HDR image. In particular, FIG. 2A illustrates a SPAD array 200, which may correspond to the SPAD array(s) 112 described hereinabove with reference to FIG. 1. In this regard, a SPAD pixel 202 of the SPAD array is configurable to trigger avalanche events in response to detecting photons. The SPAD pixel 202 may be operated in a controlled, gated manner to facilitate different exposure operations for HDR imaging.

FIG. 2A illustrates dashed lines and ellipsis 240 between SPAD pixels and representations of exposure operations that will be described in more detail hereafter. The dashed lines and ellipsis 240 indicate that the exposure operations described hereafter may be performed using any number of the SPAD pixels of the SPAD array 200 (e.g., all SPAD pixels). A single instance of the exposure operations is shown in FIG. 2A for the sake of clarity and simplicity. FIG. 2A additionally provides a time axis t to illustrate the temporal relationship among the different exposure operations that will be described hereinafter.

FIG. 2A shows that, to facilitate HDR imaging, SPAD pixels of a SPAD array 200 are configured to perform a split long exposure operation 204 and a short exposure operation 214. The split long exposure operation 204 includes at least a first long exposure 206 and a second long exposure 208. Although FIG. 2A shows the split long exposure operation 204 as including only a first long exposure 206 and a second long exposure 208, a split long exposure operation 204 may include any number of separate parts/exposures.

FIG. 2A depicts (by dashed lines extending downward from the first long exposure 206) that the first long exposure 206 includes applying a first set of long exposure shutter operations 210. As noted above, applying a shutter operation to a SPAD pixel configures the SPAD pixel to trigger avalanche events in response to detected photons. Thus, the presence of an avalanche event during a shutter operation indicates that the SPAD pixel detected a photon during the shutter operation. Whether a SPAD pixel experienced an avalanche event (and therefore detected a photon) during a shutter operation may be represented by a binary "1" or "0", with "1" indicating that an avalanche event occurred during the shutter operation and with "0" indicating that no avalanche event occurred during the shutter operation. Accordingly, FIG. 2A depicts each long exposure shutter operation 210 in association with a binary "1" or "0."

FIG. 2A also depicts that the individual long exposure shutter operations 210 are performed over a particular long exposure gate time 212. The long exposure gate time 212 is the duration over which a SPAD pixel becomes configured to trigger an avalanche event in response to a detected photon. Longer gate times may be beneficial for detecting photon reflections from darker objects within a captured environment.

Although FIG. 2A only explicitly depicts the first set of long exposure shutter operations 210 associated with the first long exposure 206 of the split long exposure operation 204, a corresponding second set of long exposure shutter operations is applied to facilitate the second long exposure 208 of the split long exposure operation 204. As will be described in more detail hereafter, the results of the first long exposure 206 and the second long exposure 208 may be combined for forming a long exposure component of an HDR image.

FIG. 2A furthermore illustrates that the first long exposure 206 and the second long exposure 208 of the split long exposure operation 204 are temporally offset from one another. Stated differently, a time period intervenes between the performance of the first long exposure 206 and the second long exposure 208. In this way, a short exposure operation 214 may be performed during the time period that intervenes between the first long exposure 206 and the second long exposure 208 of the split long exposure operation 204.

As is shown in FIG. 2A by dashed lines extending downward from the short exposure operation 214, the short exposure operation includes applying a set of short exposure shutter operations 216. Similar to the long exposure shutter operations 210, the short exposure shutter operations 216 configure the SPAD pixel(s) to trigger avalanche events in response to detected photons, and the presence of an avalanche event (and therefore a detected photon) may be represented by a binary "1" or "0."

As is evident from FIG. 2A, the short exposure shutter operations 216 are associated with a short exposure gate time 218, and the short exposure gate time 218 is shorter than the long exposure gate time 212 associated with the long exposure shutter operations 210. In one example, for 11-bit data, a long exposure gate time 212 may comprise about 11 ms (e.g., when performing long exposure shutter operations at about 90 fps), whereas a short exposure gate time 218 may comprise about 0.5 ms (e.g., when performing short exposure shutter operations 216 at about 900 fps). Shorter gate times may be beneficial for capturing brightly illuminated objects in an environment while avoiding oversaturation.

Furthermore, as is evident from FIG. 2A, the long exposure shutter operations of the first long exposure 206 and/or the second long exposure 208 are performed over a longer effective exposure time as compared with the effective exposure time for performing the short exposure shutter operations 216. Accordingly, the first and second long exposures 206 are, in some implementations, configured to appropriately expose darker objects/areas of a captured environment, whereas the short exposure operation 214 is configured to appropriately expose brighter objects/areas of a captured environment.

Figure 2B:
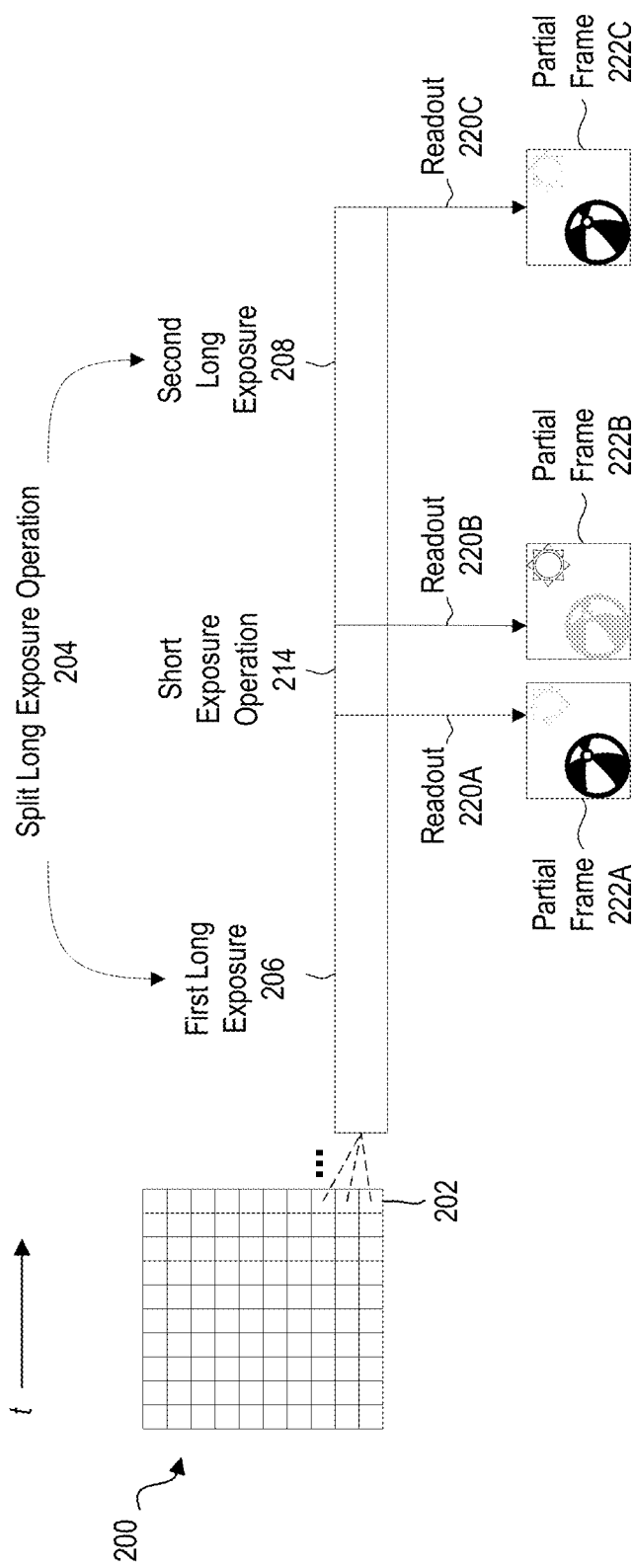

FIG. 2B illustrates that, in some instances, respective partial frames are generated from the separate exposure components for capturing an HDR image (i.e., the first long exposure 206, the intervening short exposure operation 214, and the second long exposure 208). In particular, FIG. 2B illustrates readout 220A being performed after the first long exposure 206 to form a partial frame 222A. For a SPAD array, a "readout" comprises determining or outputting a number of photons detected over a set of shutter operations on a per-pixel basis. Pixels capturing brighter portions of the captured environment will have counted a greater number of photons than pixels capturing darker portions of the captured environment. Thus, the per-pixel number of photons detected over the set of shutter operations may be used to form an intensity image.

Accordingly, FIG. 2B shows the partial frame 222A formed based on the readout 220A from performing the first set of long exposure shutter operations 210 of the first long exposure 206. Partial frame 222A conceptually represents a captured scene that includes a beach ball and the sun. The beach ball may appear relatively dark compared to the sun (e.g., the sun is situated behind the beachball relative to the image capture viewpoint, resulting in shadowing of the beach ball). Thus, because of the long exposure time associated with the first long exposure 206, the partial frame 222A depicts the darker beach ball as being appropriately exposed and depicts the brighter sun as being overexposed.

FIG. 2B also shows a partial frame 222B formed based on the readout 220B from performing the short exposure shutter operations 216 of the short exposure operation 214. Because of the short exposure time associated with the short exposure operation 214, the partial frame 222B depicts the darker beach ball as being underexposed and depicts the brighter sun as being appropriately exposed. FIG. 2B furthermore shows the partial frame 222C formed based on readout 220C from performing the long exposure shutter operations of the second long exposure 208. Similar to partial frame 222A, the partial frame 222C depicts the darker beach ball as being appropriately exposed and depicts the brighter sun as being overexposed.

Figure 2C:
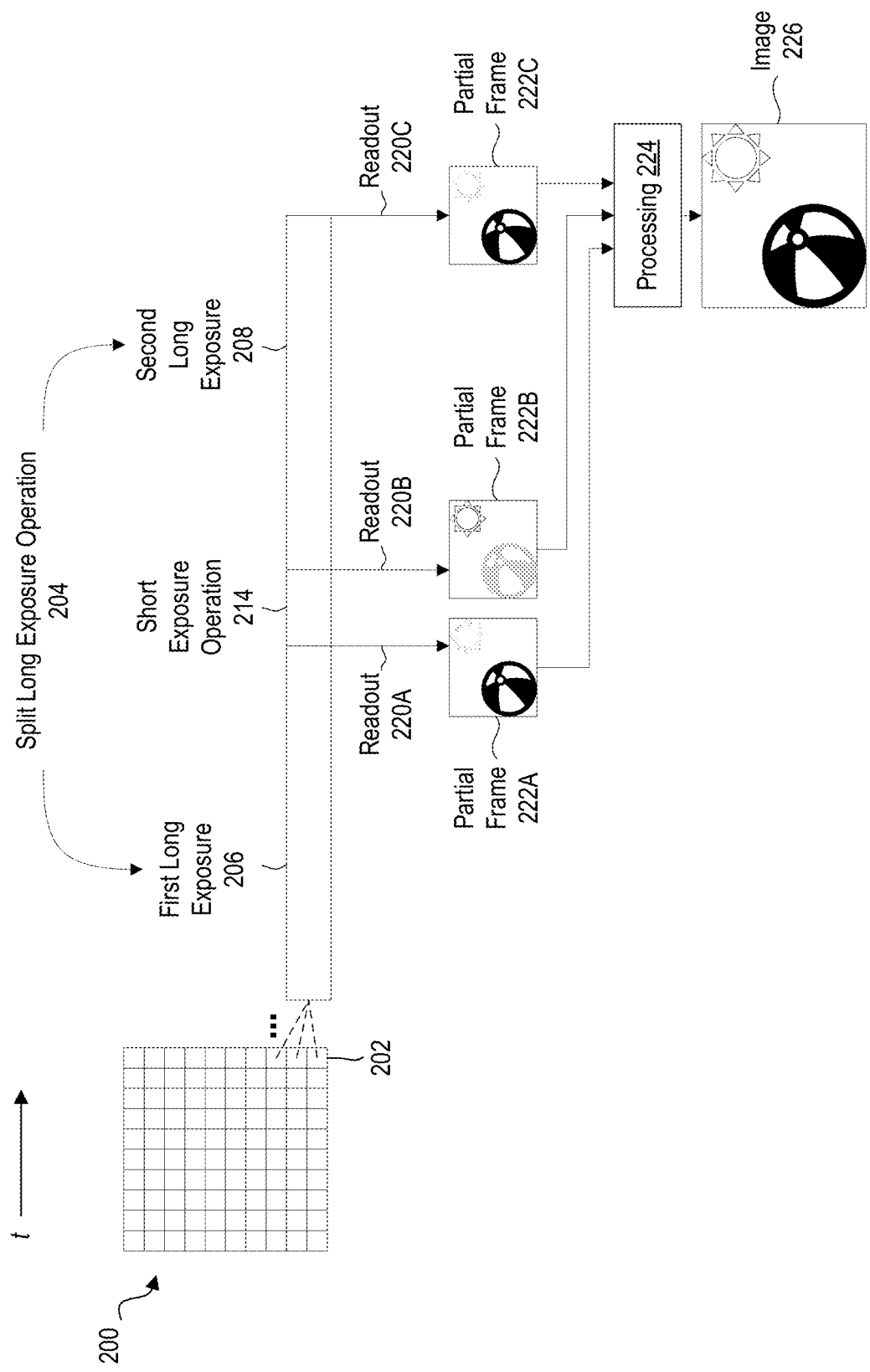

Using these partial frames 222A, 222B, and 222C, a system may generate a composite HDR image that depicts both bright and dark captured objects as appropriately exposed. For example, FIG. 2C shows processing 224 being performed to combine the partial frames 222A, 222B, and 222C to form an image 226. FIG. 2C shows the image 226 as depicting an appropriately exposed representation of the beach ball (borrowing from the partial frames 222A and 222C captured using longer exposure times) and an appropriately exposed representation of the sun (borrowing from the partial frame 222B captured using a shorter exposure time).

Image 226 thus comprises and HDR image. Because the short exposure operation is performed between the first and second long exposures 206 and 208 of the split long exposure operation 204, spatial misalignment between partial frame 222B and partial frames 222A and 222C may be reduced. Furthermore, because the separate long exposures 206 and 208 are performed to generate separate long exposure partial frames 222A and 222C, the separate long exposure partial frames 222A and 222C may experience reduced motion blur as compared to situations where a single, unbroken long exposure operation is performed to generate a single long exposure partial frame.

Although FIGS. 2A-2C depict the first long exposure 206 and the second long exposure 208 being performed over equal respective durations of time (e.g., respective effective exposure times), separate components of the split long exposure operation 204 may, in some implementations, be performed over different respective durations of time. Furthermore, in some instances, the effective exposure time of a subsequent exposure operation (e.g., a long exposure component or short exposure operation) is dynamically modified based on the readout of a preceding exposure operation. For example, the duration of time over which the second long exposure 208 will be performed may be modified based on a detection of underexposed objects in the partial frame 222A and/or the readout 220A of the first long exposure 206.

In some implementations, additional actions may be performed to further mitigate or reduce motion blur in a captured HDR image. For example, in some instances, a system performs a motion compensation operation to generate an HDR image, in combination with the techniques described above of utilizing a split long exposure operation 204 and an intervening short exposure operation 214.

Figure 2D:
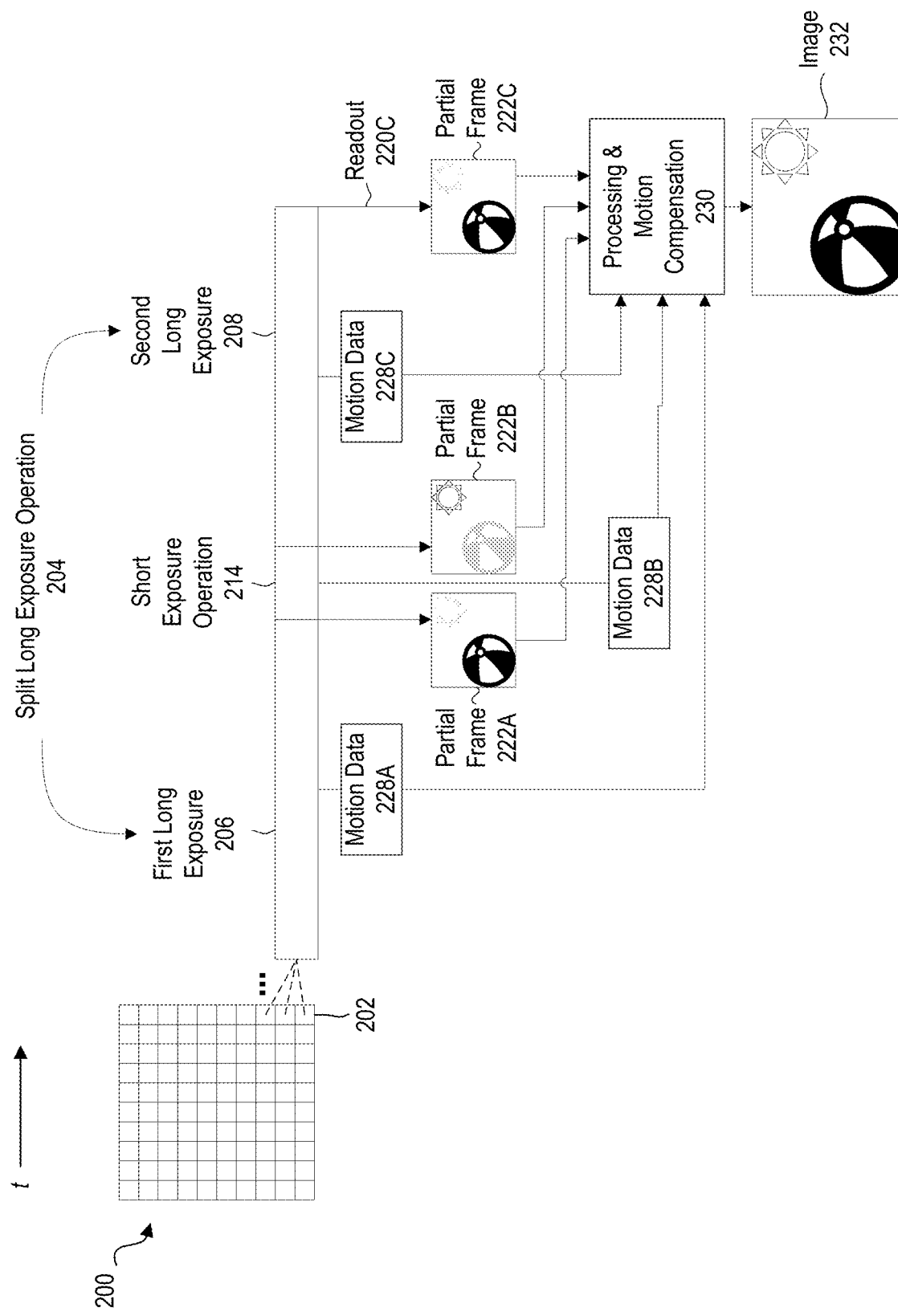

FIG. 2D illustrates an example motion compensation operation that is based on motion data (e.g., obtained via IMU(s) 114). In particular, FIG. 2D illustrates motion data 228A associated with the first long exposure 206, motion data 228B associated with the short exposure operation 214, and motion data 228C associated with the second long exposure 208. The various motion data are, in some instances, captured by an IMU 114 during the performance of the various exposure operations described hereinabove. For example, the IMU 114 may capture motion data 228A during the first long exposure 206. The motion data 228A may represent one or more average or median motion metrics during the first long exposure 206. The IMU 114 may also capture motion data 228B during the short exposure operation 214. The motion data 228B may represent one or more average or median motion metrics during the short exposure operation 214 (e.g., a measured change in position relative to a position represented by the motion data 228A). Similarly, the IMU 114 may also capture motion data 228C during the second long exposure 208. The motion data 228C may represent one or more average or median motion metrics during the second long exposure 208 (e.g., a measured change in position relative to a position represented by the motion data 228B).

The motion data associated with the various exposure operations may therefore be associated with the different partial frames generated based on the various exposure operations. For example, in on example, motion data 228A is associated with partial frame 222A, motion data 228B is associated with partial frame 222B, and motion data 228C is associated with partial frame 222C. In this way, the motion data 228A, 228B, and 228C may be used to compensate for movement of the SPAD array 200 between the capturing of partial frames 222A, 222B, and 222C to align the partial frames 222A, 222B, and 222C for generating an HDR image. Thus, FIG. 2D illustrates processing and motion compensation 230 that uses the motion data 228A, 228B, and 228C and the associated partial frames 222A, 222B, and 222C to generate the image 232.

In some instances, a motion compensation operation for generating the image additionally or alternatively utilizes computer vision-based motion compensation techniques. For example, in some implementations, a motion compensation operation may include global or local downsampling, alignment, and upsampling operations to reduce motion artifacts in an HDR image (e.g., image 232).

Figure 3:
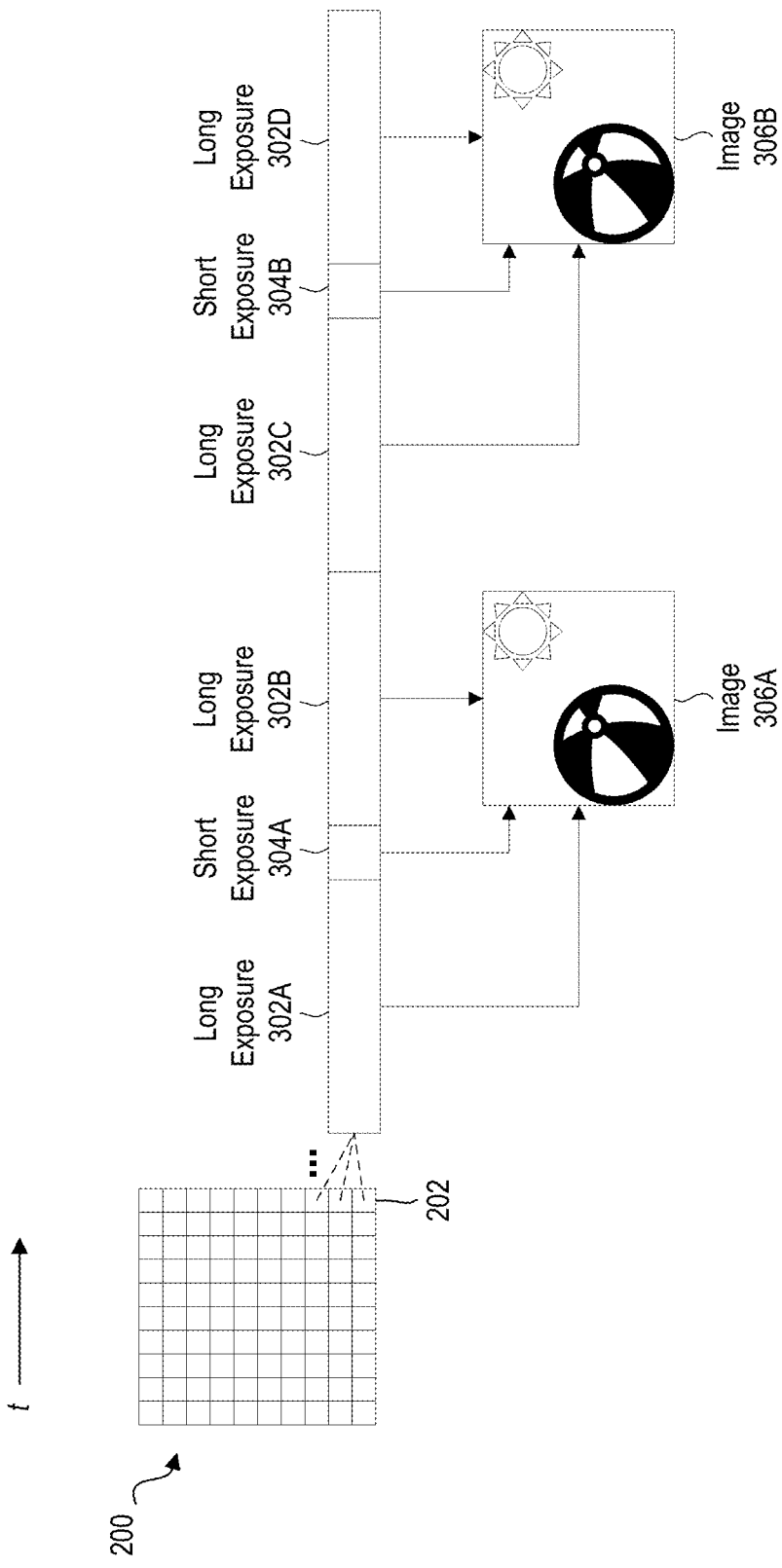
FIGS. 3 and 4 illustrate examples of capturing consecutive HDR images using a SPAD array.
Figure 4:
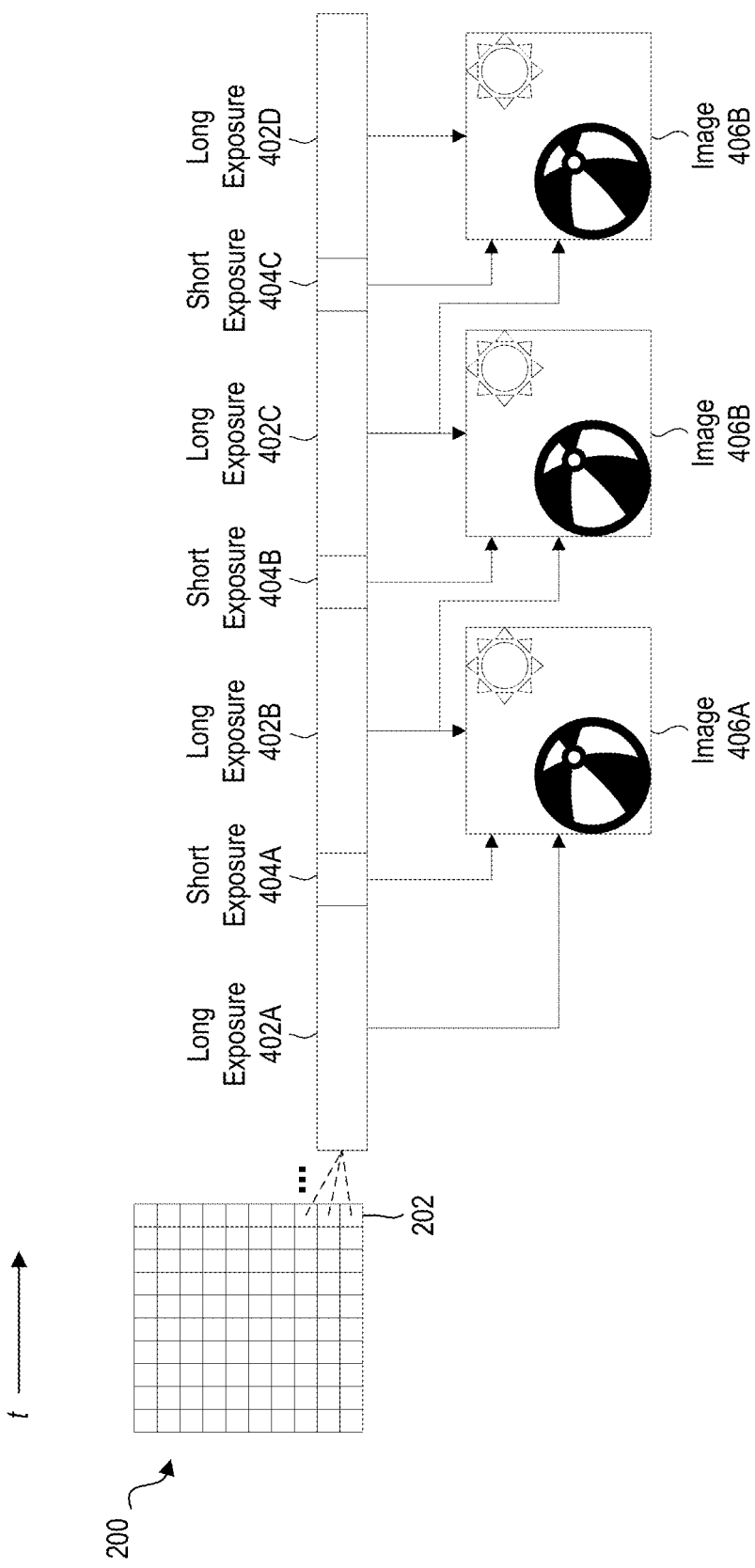

FIGS. 3 and 4 illustrate examples of capturing consecutive HDR images using a SPAD array. As an example implementation, consecutive HDR images may be captured using one or more SPAD arrays of an HMD and may be used to generate pass-through images of a captured environment for presentation to a user of the HMD in real-time.

FIG. 3 illustrates various long exposures and short exposures being performed using the SPAD array 200. In particular, FIG. 3 shows long exposure 302A, which is followed by short exposure 304A, and which is followed by long exposure 302B. FIG. 3 illustrates that the long exposure 302A, the short exposure 304A, and the long exposure 302B may be used to generate an image 306A using techniques similar to those described hereinabove with reference to FIGS. 2A-2D (e.g., as indicated via arrows extending from the long exposure 302A, the short exposure 304A, and the long exposure 302B to the image 306A). FIG. 3 omits details related to readout, generating partial frames, processing, motion compensation, etc. for clarity).

FIG. 3 illustrates an example implementation in which long exposure 302C follows long exposure 302B, short exposure 304B follows long exposure 302C, and long exposure 302D follows short exposure 304B. Image 306B of FIG. 3 is formed temporally subsequent to image 306A and, similar to image 306A, image 306B is formed based on long exposure 302C, short exposure 304B, and long exposure 302B (e.g., as indicated via arrows extending from the long exposure 302C, the short exposure 304B, and the long exposure 302D to the image 306B). In this regard, a system may consecutively generate HDR images at a desirable framerate (e.g., 30 fps or greater) for various purposes (e.g., for presentation to a user of an HMD).

The long exposure shutter operations of the long exposures 302C and/or 302D may have a same or different gate time period as the long exposure shutter operations of the long exposures 302A and/or 302B. Similarly, the short exposure shutter operations of the short exposure 304B may have a same or different gate time period as the short exposure operations of the short exposure 304B.

FIG. 4 illustrates an additional implementation of generating consecutive HDR images. FIG. 4 shows long exposures and short exposures performed in an interleaved manner, with each short exposure immediately following a long exposure and with each long exposure immediately following a short exposure. In particular, FIG. 4 shows an initial long exposure 402A followed by a short exposure 404A, which is followed by a long exposure 402B, which is followed by a short exposure 404B, which is followed by a long exposure 402C, which is followed by a short exposure 404C, and which is followed by a long exposure 402D.

Similar to image 306A of FIG. 3, FIG. 4 illustrates that the long exposure 402A, the short exposure 404A, and the long exposure 402B may be used to generate an image 406A using techniques similar to those described hereinabove with reference to FIGS. 2A-2D (e.g., as indicated via arrows extending from the long exposure 402A, the short exposure 404A, and the long exposure 402B to the image 406A).

FIG. 4 additionally shows that, in some instances, a single long exposure is used to form multiple HDR images. By way of example, FIG. 4 shows that the image 406B is formed based on the long exposure 402B, the short exposure 404B, and the long exposure 402C (as indicated by arrows extending from the long exposure 402B, the short exposure 404B, and the long exposure 402C to the image 406B). In this regard, the long exposure 402B is used to form both the image 406A and the image 406B. Such functionality may be implemented to advantageously facilitate a higher rate of consecutive HDR image capture/generation.

Example Method(s) for HDR Image Capture Using SPADs

The following discussion now refers to a number of methods and method acts that may be performed by the disclosed systems. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 5:
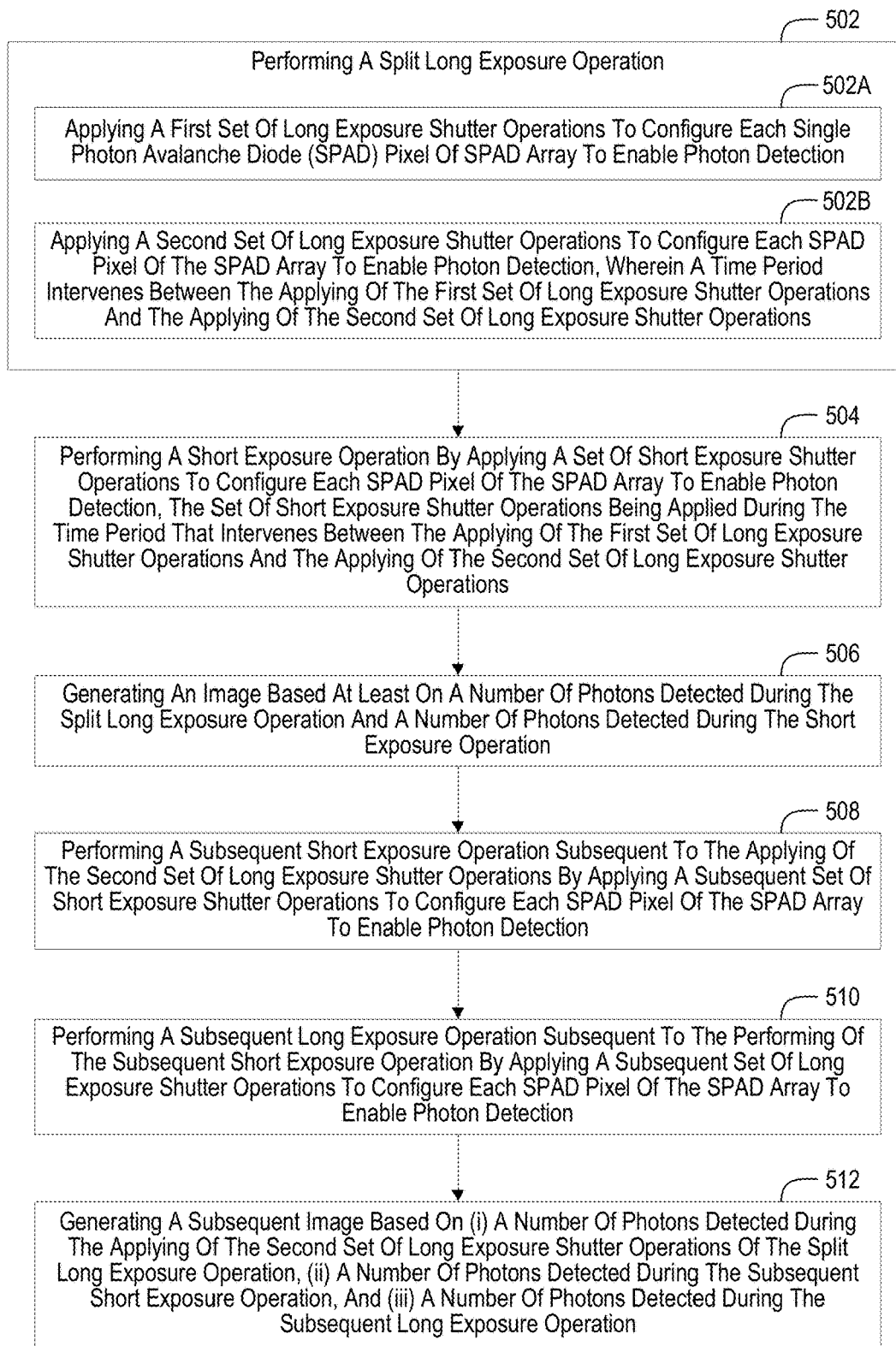
FIG. 5 illustrates an example flow diagram depicting acts associated with facilitating HDR image capture using SPADs.

FIG. 5 illustrates an example flow diagram 500 depicting acts associated with facilitating HDR image capture using SPADs. The discussion of the various acts represented in the flow diagrams include references to various hardware components described in more detail with reference to FIG. 1.

Act 502 of flow diagram 500 includes performing a split long exposure operation. Act 502 is performed, in some instances, by a system 100 utilizing processor(s) 102, storage 104, sensor(s) 110, input/output system(s) 116, communication system(s) 118, and/or other components.

As illustrated in FIG. 5, act 502 is associated with additional sub-acts. For example, act 502 includes act 502A of applying a first set of long exposure shutter operations to configure each single photon avalanche diode (SPAD) pixel of SPAD array to enable photon detection. Photon detection is facilitated, for each long exposure shutter operation, by detecting whether an avalanche event occurred during the long exposure shutter operation. Act 502 also includes act 502B of applying a second set of long exposure shutter operations to configure each SPAD pixel of the SPAD array to enable photon detection, wherein a time period intervenes between the applying of the first set of long exposure shutter operations and the applying of the second set of long exposure shutter operations.

Act 504 of flow diagram 500 includes performing a short exposure operation by applying a set of short exposure shutter operations to configure each SPAD pixel of the SPAD array to enable photon detection, the set of short exposure shutter operations being applied during the time period that intervenes between the applying of the first set of long exposure shutter operations and the applying of the second set of long exposure shutter operations. Act 504 is performed, in some instances, by a system 100 utilizing processor(s) 102, storage 104, sensor(s) 110, input/output system(s) 116, communication system(s) 118, and/or other components. In some instances, long exposure shutter operations of the first and second sets of long exposure shutter operations (referred to according to act 502) have a longer gate time period than short exposure shutter operations of the set of short exposure shutter operations.

Act 506 of flow diagram 500 includes generating an image based at least on a number of photons detected during the split long exposure operation and a number of photons detected during the short exposure operation. Act 506 is performed, in some instances, by a system 100 utilizing processor(s) 102, storage 104, sensor(s) 110, input/output system(s) 116, communication system(s) 118, and/or other components.

In some instances, a system generating the image applies a motion compensation operation to generate the image. An example motion compensation operation may be motion-based and may include (i) associating the first set of long exposure shutter operations with first motion data captured during the applying of the first set of long exposure shutter operations, (ii) associating the set of short exposure shutter operations with second motion data captured during the applying of the set of short exposure shutter operations, (iii) associating the second set of long exposure shutter operations with third motion data captured during the applying of the second set of long exposure shutter operations, and (iv) using the first, second, and third motion data to reduce motion blur in the image.

In some instances, the motion compensation operation additionally or alternatively includes a computer vision-based motion compensation operation (e.g., downsampling, aligning/filtering, and upsampling).

Act 508 of flow diagram 500 includes performing a subsequent short exposure operation subsequent to the applying of the second set of long exposure shutter operations by applying a subsequent set of short exposure shutter operations to configure each SPAD pixel of the SPAD array to enable photon detection. Act 508 is performed, in some instances, by a system 100 utilizing processor(s) 102, storage 104, sensor(s) 110, input/output system(s) 116, communication system(s) 118, and/or other components. In some implementations, short exposure shutter operations of the subsequent set of short exposure shutter operations of have a same gate time period as short exposure shutter operations of the set of short exposure shutter operations.

Act 510 of flow diagram 500 includes performing a subsequent long exposure operation subsequent to the performing of the subsequent short exposure operation by applying a subsequent set of long exposure shutter operations to configure each SPAD pixel of the SPAD array to enable photon detection. Act 510 is performed, in some instances, by a system 100 utilizing processor(s) 102, storage 104, sensor(s) 110, input/output system(s) 116, communication system(s) 118, and/or other components. In some implementations, long exposure shutter operations of the subsequent set of long exposure shutter operations of have a same gate time period as long exposure shutter operations of the first and second sets of long exposure shutter operations.

Furthermore, act 512 of flow diagram 500 includes generating a subsequent image based on (i) a number of photons detected during the applying of the second set of long exposure shutter operations of the split long exposure operation, (ii) a number of photons detected during the subsequent short exposure operation, and (iii) a number of photons detected during the subsequent long exposure operation. Consecutively generated images may be used in various applications, such as for facilitating pass-through imaging on an HMD.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for facilitating high dynamic range (HDR) image capture, comprising:
   an image sensor array comprising a plurality of sensor pixels;
   one or more processors; and
   one or more hardware storage devices storing instructions that are executable by the one or more processors to configure the system to:
      perform a split long exposure operation, comprising:
         applying a first set of long exposure shutter operations to configure each sensor pixel of the image sensor array to enable photon detection; and
         applying a second set of long exposure shutter operations to configure each sensor pixel of the image sensor array to enable photon detection, wherein a time period intervenes between the applying of the first set of long exposure shutter operations and the applying of the second set of long exposure shutter operations;

perform a short exposure operation, comprising:
applying a set of short exposure shutter operations to configure each sensor pixel of the image sensor array to enable photon detection, the set of short exposure shutter operations being applied during the time period that intervenes between the applying of the first set of long exposure shutter operations and the applying of the second set of long exposure shutter operations; and generate an image based at least on a number of photons detected during the split long exposure operation and a number of photons detected during the short exposure operation.

2. The system of claim 1, wherein long exposure shutter operations of the first and second sets of long exposure shutter operations have a longer gate time period than short exposure shutter operations of the set of short exposure shutter operations.

3. The system of claim 1, wherein the instructions are executable by the one or more processors to further configure the system to:
perform a subsequent short exposure operation subsequent to the applying of the second set of long exposure shutter operations, the subsequent short exposure operation comprising:
applying a subsequent set of short exposure shutter operations to configure each sensor pixel of the image sensor array to enable photon detection; and
perform a subsequent long exposure operation subsequent to the performing of the subsequent short exposure operation, comprising:
applying a subsequent set of long exposure shutter operations to configure each sensor pixel of the image sensor array to enable photon detection.

4. The system of claim 3, wherein the instructions are executable by the one or more processors to further configure the system to generate a subsequent image based on (i) a number of photons detected during the applying of the second set of long exposure shutter operations of the split long exposure operation, (ii) a number of photons detected during the subsequent short exposure operation, and (iii) a number of photons detected during the subsequent long exposure operation.

5. The system of claim 4, wherein short exposure shutter operations of the subsequent set of short exposure shutter operations of have a same gate time period as short exposure shutter operations of the set of short exposure shutter operations.

6. The system of claim 5, wherein long exposure shutter operations of the subsequent set of long exposure shutter operations of have a same gate time period as long exposure shutter operations of the first and second sets of long exposure shutter operations.

7. The system of claim 1, wherein the instructions are executable by the one or more processors to further configure the system to apply a motion compensation operation to generate the image.

8. The system of claim 7, wherein the motion compensation operation comprises:
associating the first set of long exposure shutter operations with first motion data captured during the applying of the first set of long exposure shutter operations;
associating the set of short exposure shutter operations with second motion data captured during the applying of the set of short exposure shutter operations;
associating the second set of long exposure shutter operations with third motion data captured during the applying of the second set of long exposure shutter operations; and
using the first, second, and third motion data to reduce motion blur in the image.

9. The system of claim 7, wherein the motion compensation operation comprises a computer vision-based motion compensation operation.

10. The system of claim 1, wherein an effective exposure time of the second set of long exposure shutter operations is determined based on a readout from the first set of long exposure shutter operations.

11. A system for facilitating high dynamic range (HDR) image capture, comprising:
an image sensor array comprising a plurality of sensor pixels;
one or more processors; and
one or more hardware storage devices storing instructions that are executable by the one or more processors to configure the system to:
perform a first short exposure operation comprising applying a first set of short exposure shutter operations to configure each sensor pixel of the image sensor array to enable photon detection;
perform a long exposure operation comprising applying a set of long exposure shutter operations to configure each sensor pixel of an image sensor array to enable photon detection;
generate a first image based at least on a number of photons detected during the first short exposure operation and the long exposure operation;
perform a second short exposure operation comprising applying a second set of short exposure shutter operations to configure each sensor pixel of the image sensor array to enable photon detection, wherein the set of long exposure shutter operations is applied during a time period that intervenes between the applying of the first set of short exposure shutter operations and the applying of the second set of short exposure shutter operations; and
generate a second image based at least on a number of photons detected during the long exposure operation and the second short exposure operation.

12. The system of claim 11, wherein long exposure shutter operations of the set of long exposure shutter operations have a longer gate time period than short exposure shutter operations of the first and second sets of short exposure shutter operations.

13. The system of claim 11, wherein the instructions are executable by the one or more processors to further configure the system to:
prior to performing the first short exposure operation, perform an initial long exposure operation comprising applying an initial set of long exposure shutter operations to configure each sensor pixel of an image sensor array to enable photon detection, wherein the first image is further based on a number of photons detected during the initial long exposure operation.

14. The system of claim 13, wherein long exposure shutter operations of the initial set of long exposure shutter operations of have a same gate time period as long exposure shutter operations of the set of long exposure shutter operations.

15. The system of claim 11, wherein the instructions are executable by the one or more processors to further configure the system to:
- subsequent to performing the second short exposure operation, perform a subsequent long exposure operation comprising applying a subsequent set of long exposure shutter operations to configure each sensor pixel of an image sensor array to enable photon detection, wherein the second image is further based on a number of photons detected during the subsequent long exposure operation.

16. The system of claim 15, wherein long exposure shutter operations of the subsequent set of long exposure shutter operations of have a same gate time period as long exposure shutter operations of the set of long exposure shutter operations.

17. The system of claim 11, wherein short exposure shutter operations of the first set of short exposure shutter operations of have a same gate time period as short exposure shutter operations of the second set of short exposure shutter operations.

18. The system of claim 11, wherein the instructions are executable by the one or more processors to further configure the system to apply a motion compensation operation to generate the first image or the second image.

19. The system of claim 11, wherein the image sensor array comprises a single photon avalanche diode (SPAD) image sensor array.

20. A method for facilitating high dynamic range (HDR) image capture, comprising:
- performing a split long exposure operation, comprising:
  - applying a first set of long exposure shutter operations to configure each sensor pixel of an image sensor array to enable photon detection; and
  - applying a second set of long exposure shutter operations to configure each sensor pixel of the image sensor array to enable photon detection, wherein a time period intervenes between the applying of the first set of long exposure shutter operations and the applying of the second set of long exposure shutter operations;
- performing a short exposure operation, comprising:
  - applying a set of short exposure shutter operations to configure each sensor pixel of the image sensor array to enable photon detection, the set of short exposure shutter operations being applied during the time period that intervenes between the applying of the first set of long exposure shutter operations and the applying of the second set of long exposure shutter operations; and
- generating an image based at least on a number of photons detected during the split long exposure operation and a number of photons detected during the short exposure operation.

21. The method of claim 20, wherein long exposure shutter operations of the first and second sets of long exposure shutter operations have a longer gate time period than short exposure shutter operations of the set of short exposure shutter operations.

* * * * *